United States Patent [19]

Aldenhoven

[11] Patent Number: 4,617,655
[45] Date of Patent: Oct. 14, 1986

[54] HOLDER FOR A RIGID INFORMATION DISC AND LOADING-SYSTEM COMPRISING A LOADING MECHANISM ADAPTED TO COOPERATE WITH SUCH A HOLDER

[75] Inventor: Ghislanus M. A. M. Aldenhoven, Eindhoven, Netherlands

[73] Assignee: U.S. Philips Corporation, New York, N.Y.

[21] Appl. No.: 734,378

[22] Filed: May 15, 1985

[30] Foreign Application Priority Data
May 25, 1984 [NL] Netherlands .......................... 8401672

[51] Int. Cl.⁴ ...................... B65D 85/02; G11B 23/02
[52] U.S. Cl. .................................... 369/291; 206/309; 206/444; 360/133; 369/77.2
[58] Field of Search ............... 369/77.2, 291; 206/444, 206/309, 312, 313, 303, 591; 360/133

[56] References Cited

U.S. PATENT DOCUMENTS 4,149,729  4/1979  Peters ................................. 369/77.2
4,433,410  2/1984  Siryj et al. ......................... 369/77.2

FOREIGN PATENT DOCUMENTS 2319993  11/1974  Fed. Rep. of Germany ...... 369/291

OTHER PUBLICATIONS

Stereo Review, vol. 50, No. 4, Apr. 1985, pp. 42 & 43.

Primary Examiner—Steven L. Stephan
Attorney, Agent, or Firm—David R. Treacy

[57] ABSTRACT

A holder for a rigid information disc comprises a rectangular frame which includes a first disc-supporting section near a first peripheral side of the frame and a second disc-supporting section adjoining a second peripheral side located opposite the first side. The frame carries movable clamping means for clamping the information disc onto the frame. The frame is at least in part resiliently deflectable and is capable of returning from a deflected position to a flat position. The first and the second disc-supporting sections are interconnected by at least one resilient connecting element which permits deflection of the frame into the deflected position in which position the first and the second peripheral sides extend at least substantially parallel to each other. The clamping means can be actuated; the clamping means are situated near the connecting elements and in the deflected position of the frame do not release the information disc until these means have been actuated.

24 Claims, 14 Drawing Figures

HOLDER FOR A RIGID INFORMATION DISC AND LOADING-SYSTEM COMPRISING A LOADING MECHANISM ADAPTED TO COOPERATE WITH SUCH A HOLDER

BACKGROUND OF THE INVENTION

The invention relates to a holder for a rigid information disc, comprising a rectangular frame which comprises a first disc-supporting section situated near a first peripheral side of the frame and a second disc-supporting section adjoining a second peripheral side located opposite the first peripheral side. The frame carries movable clamping means for retaining the information disc on the frame; the frame is at least in part resiliently deflectable and is capable of resiling from a deflected position to a flat position.

A holder of this type is known from German Offenlegungsschrift No. 3,135,795. In such a holder the information disc is enclosed in the frame so that it need not be touched when it is put onto the turntable. The clamping means of the known holder retain the disc with a clearance such that the disc can be played while being contained in the holder. Therefore, these clamping means cannot be moved away from the disc by mechanical means in the disc-record player in order to remove the disc from the frame. The frame is resiliently deflectable to allow the disc to be manually withdrawn from or inserted underneath the clamping means after deflection of the frame, for example in order to replace it with another disc.

In disc-record players intended for playing optical information discs such as those of the "Compact Disc" type, it is desirable to remove the disc from the holder before playing and to bring the holder to a position at some distance from the turntable. However, it is desirable that these operations can be effected inside the disc-record player in a mechanically controlled manner. The above-mentioned known holder is not suitable for this purpose.

SUMMARY OF THE INVENTION

It is the object of an invention to construct a holder of the type specified in the opening paragraph in such a way that after deflection of the frame into the deflected position, the disc can be transferred to the turntable while the frame is in this position.

To this end the invention is characterized in that the first and the second disc-supporting sections are interconnected by at least one resilient connecting element which permits deflection of the frame into the deflected position. In this position the first and second peripheral sides extend at least substantially parallel to one another, and the clamping means comprise actuating portions that are situated near the connecting element. In the deflected position of the frame the clamping means do not release the information disc until the actuating portions have been actuated.

Thus, the frame can be deflected into a bowed position at the location of the connecting element approximately halfway between the first and second disc-supporting sections, with the clamping means retaining the disc continuously on the frame during the deflection. The actuating portions of the clamping means enable the disc to be released from the frame at a predetermined instant, suitably after the disc has been positioned on the turntable of a disc-record player. Subsequently, the frame resumes the flat position under the influence of its own resilience, so that the frame is situated at some distance from the turntable and does not impede playing of the disc. Thus, the holder in accordance with the invention, not only constitutes a support for the information disc but also means for lowering the disc from a position above the turntable onto the turntable. Preferably, the various parts of the holder are injection-moulded in one piece, so that the holder is particularly suitable for mass production.

A holder in accordance with a preferred embodiment of the invention is characterized in that two connecting elements are arranged between the disc-supporting sections, which connecting elements are each substantially strip-shaped and extend at least substantially perpendicularly to the first and second peripheral sides of the frame. This provides a stable connection between the two disc-supporting sections and ensures that deflection of the holder always proceeds in an accurately predetermined manner.

A holder in accordance with a further preferred embodiment of the invention is characterized in that there are provided two clamping members which are each carried on a resiliently deflectable arm which is connected at one end to the frame; the two arms are situated one adjacent each of the third and fourth peripheral sides of the frame. By arranging the clamping members on the arms, the clamping means are capable of retaining the disc continuously on the frame during deflection of the holder because they are situated near the connecting elements.

In this respect an embodiment of the holder in accordance with the invention is characterized in that the clamping members are situated at a distance from a disc-supporting surface formed by the connecting elements and the disc-supporting sections, and near these edges of the connecting elements which face the third and fourth peripheral sides, respectively, of the frame. The clamping members keep the information disc clamped against the disc-supporting surface in the flat position of the frame. Thus, the holder comprises a disc-supporting surface near the upper side of the disc, and the clamping members are located only at the side of the disc which faces the turntable, so that after the clamping members have been moved away the disc can be positioned on the turntable without any obstruction.

A holder in accordance with another preferred embodiment of the invention is characterized in that near its free end, each arm carries both the respective clamping member and the respective actuating portion, and the actuating portions on the two arms are movable in opposite directions to release the information disc. Each arm carries a stop for limiting the movement of the respective actuating portion. Since both the clamping members and the actuating portions are situated near the free ends of the arms, the two arms merely have to be moved apart to release the disc from the holder.

The invention not only relates to the holder, but also to a loading system comprising a loading mechanism carried by a chassis, which mechanism cooperates with the holder to transfer the disc to the turntable. Such a loading system in accordance with a preferred embodiment is characterized in that the loading mechanism comprises control elements which are movable relative to the chassis and which are arranged to bear against the frame of the holder at the third and fourth peripheral sides thereof, and supporting elements which are stationary relative to the chassis and which are arranged to support the frame near its first and second peripheral sides. The control elements, at least near the connecting elements, are movable in a downward direction towards a plane containing the upper side of the turntable to bring the frame into the deflected position. This provides a loading system which can operate satisfactorily within a limited space, using a simple loading mechanism which comprises a small number of parts.

In this respect a loading system in accordance with a further preferred embodiment of the invention is characterized in that the control elements comprise two channel-shaped lateral guides which are arranged to receive parts of lateral edges of the frame at the third and fourth peripheral sides thereof. These control elements extend to the free ends of the resilient arms of the holder when the latter is inserted in the loading mechanism and are pivotally connected to the chassis at points which, when the holder is inserted in the loading mechanism, are situated near the first peripheral side of the frame. Thus, the guides which guide the lateral edges of the frame during insertion merely have to be pivoted downwards to deflect the frame.

A loading system in accordance with another preferred embodiment of the invention is characterized in that the downward movement of the control elements is controlled by two eccentrically journalled control cams which form parts of two control units which also control release elements for the clamping means of the holder. As the control elements control both the deflection of the frame and the actuation of the actuating portions of the clamping means, this part of the loading mechanism can be of compact construction, and a correct timing of these functions of the loading mechanism is ensured. A centralized drive of the loading system is obtained if the two control units are arranged to be driven by a central drive means of the loading mechanism, which drive means is also adapted to drive a retraction element which brings the holder with the disc to a position above the turntable; the control units are disengaged from the drive means when the retraction element is being driven. Further, the disengagement of the control units from the drive means during retraction of the holder ensures that the holder is not deflected during retraction but only after retraction has been completed.

A holder in accordance with an embodiment of the invention will now be described in more detail, by way of example, with reference to the drawings. In the drawings.

BRIEF DESCRIPTION OF THE DRAWINGS

DETAILED DESCRIPTION OF THE PREFERRED EMBODIMENT

Figure 1:
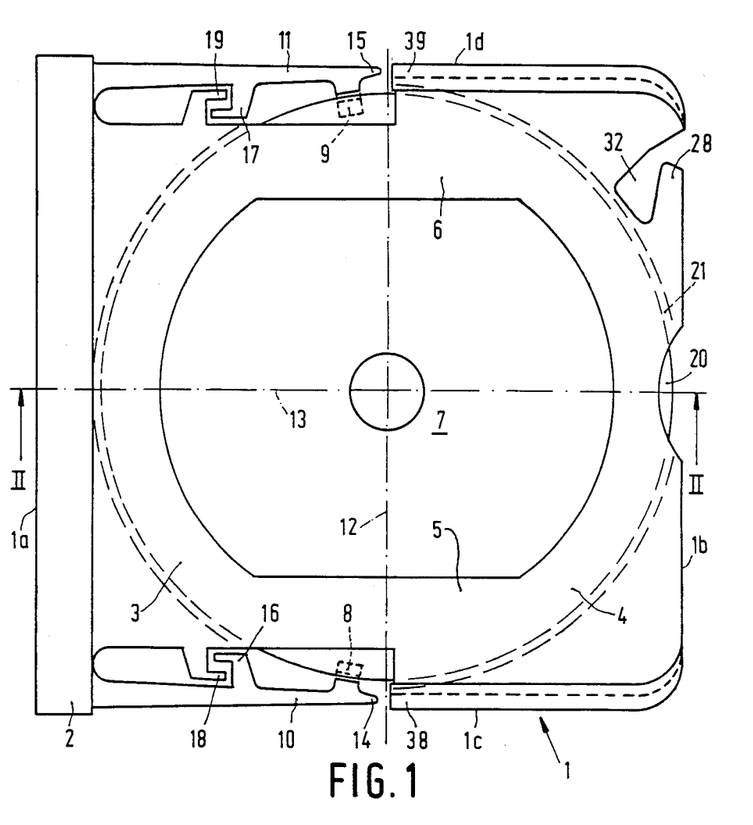
FIG. 1 is a plan view of a holder in accordance with the invention and a disc accommodated in this holder.
Figure 2:
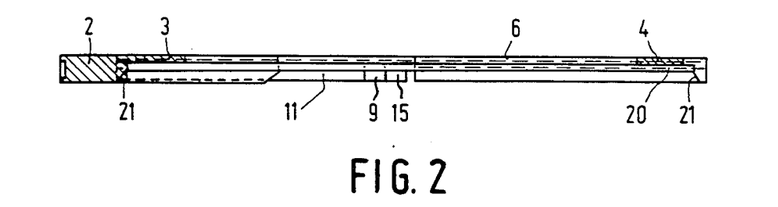
FIG. 2 is a sectional view taken on the line II—II in FIG. 1.
Figure 3:
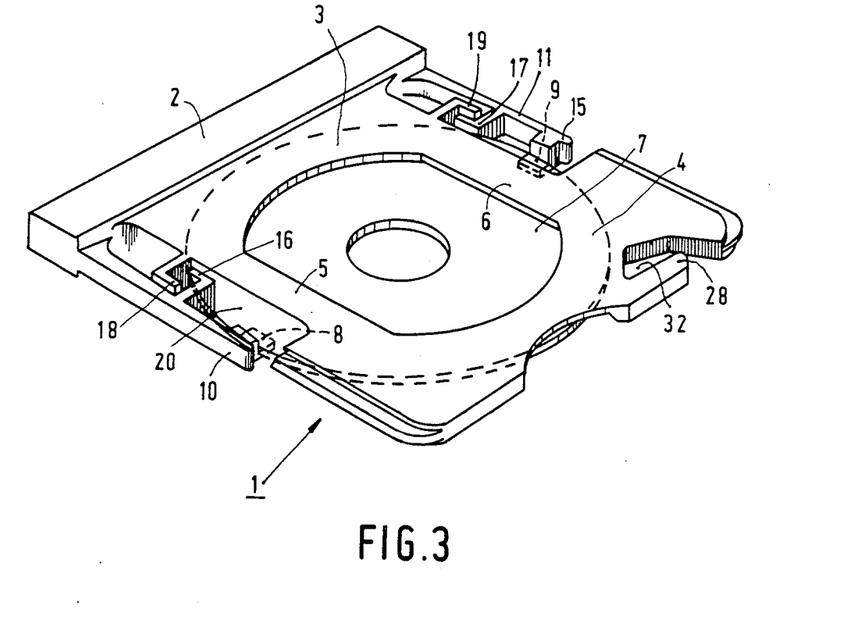
FIG. 3 is a reduced-scale perspective view of the holder shown in FIG. 1.

The holder shown in FIGS. 1 to 3 comprises a rectangular frame 1 having four peripheral sides including a first peripheral side 1a, a second peripheral side 1b situated opposite the first side, a third peripheral side 1c and a fourth peripheral side 1d situated opposite the third side. A grip 2 extends along the first peripheral side 1a. The grip 2 is connected to a first disc-supporting section 3 of the frame. A second disc-supporting section 4 adjoins the second peripheral side 1b. Two substantially strip-shaped flat resilient connecting elements 5 and 6 extend between the two disc-supporting sections 3 and 4 in directions at least substantially perpendicular to the peripheral sides 1a and 1b, respectively. Between the connecting elements 5 and 6 and the disc-supporting section 3 and 4 the frame 1 has an opening 7 so that the frame is open between these elements. The connecting elements 5 and 6 are situated near the third peripheral side 1c and the fourth peripheral side 1d, respectively.

Clamping means for the holder are arranged between the outer edges of the connecting elements 5 and 6 and the adjacent peripheral sides 1c and 1d, respectively, which means comprise clamping members 8 and 9 which are resiliently movable relative to the frame and which are each carried on a resiliently deflectable arm 10 and 11, respectively. The arms 10 and 11 extend along the peripheral sides 1c and 1d, respectively. One end of each arm is connected to the holder near the grip 2. The free end of each arm is situated near a plane 12 which extends perpendicularly to the frame and parallel to the peripheral sides 1a and 1b thereof and which is spaced substantially equidistantly from the disc-supporting sections 3 and 4. It is to be noted that most parts of the frame are situated mirror-symmetrically relative to a plane 13 which extends parallel to and is spaced equidistantly from the peripheral sides 1c and 1d. At their free ends, adjacent the clamping members 8 and 9, the arms 10 and 11 also carry actuating portions 14 and 15, respectively. These actuating portions are situated near the peripheral sides 1c and 1d, respectively. Further, the arms 10 and 11 carry hook-shaped projections 16 and 17, respectively, which, when the arms are deflected in the outward direction, function as stops by abutment with hook-shaped projections 18 and 19, respectively, on the first disc-supporting section 3.

To facilitate insertion of the disc 20 into the holder, the disc-supporting sections 3 and 4 comprise a conical centering wall 21 (see also FIG. 2), which is disposed substantially mirror-symmetrically relative to the plane 12 for the two disc-supporting sections. In the holder the disc 20 lies against a disc-supporting surface which is constituted by the surfaces of the disc-supporting sections 3 and 4 situated within the centering wall 21 and by the surfaces of the connecting elements 5 and 6. The clamping members 8 and 9 are situated at a distance from said disc-supporting surface near the peripheral sides 1c and 1d, respectively, and clamp the disc against the disc-supporting surface. The clamping members retain the disc 20 at its circumference, the resilience of the arms 10 and 11 providing the necessary clamping force.

It is to be noted that in a disc-record player the holder occupies the position shown in FIG. 2, in which the clamping members 8 and 9 are situated below the plane of the disc-supporting surface.

Figure 4:
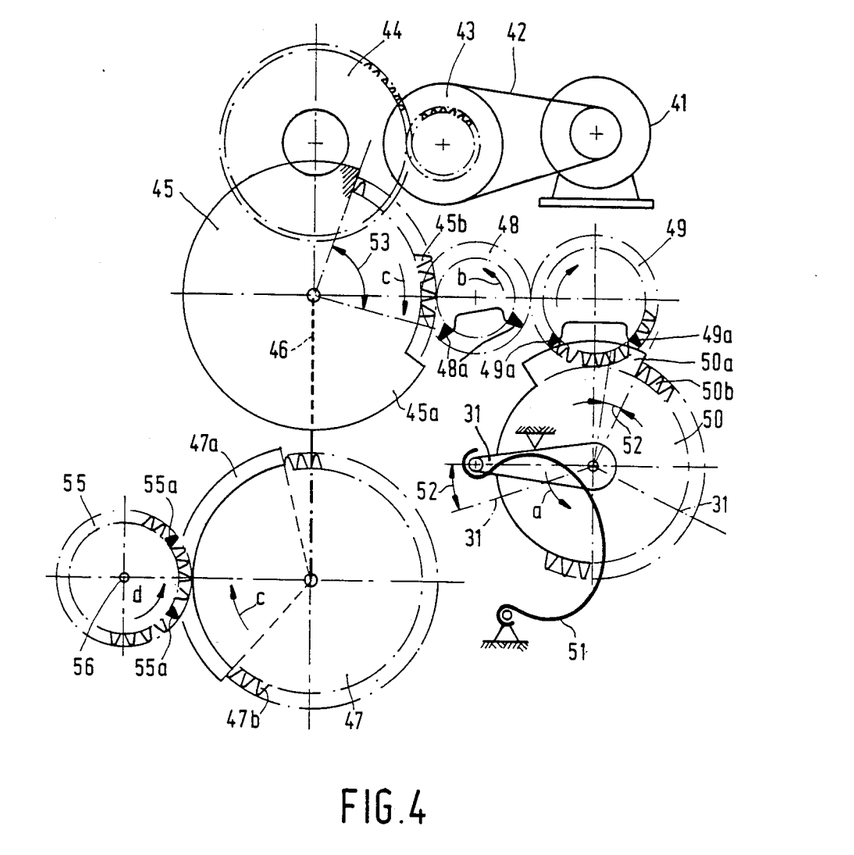
FIG. 4 shows schematically the drive of a loading mechanism of a loading system in accordance with the invention.
Figure 5:
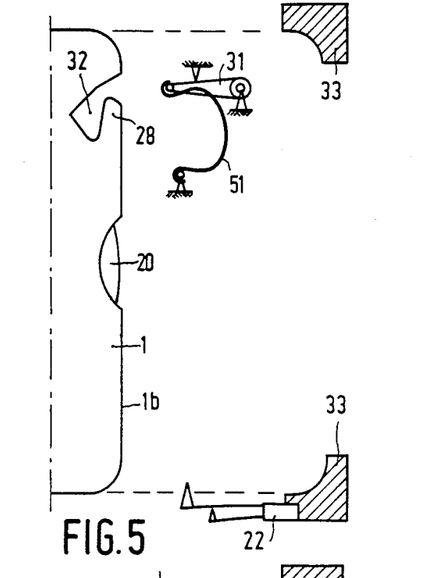
FIG. 5 is a schematic plan view of a part of the holder during manual insertion of the holder into the loading mechanism.
Figure 6:
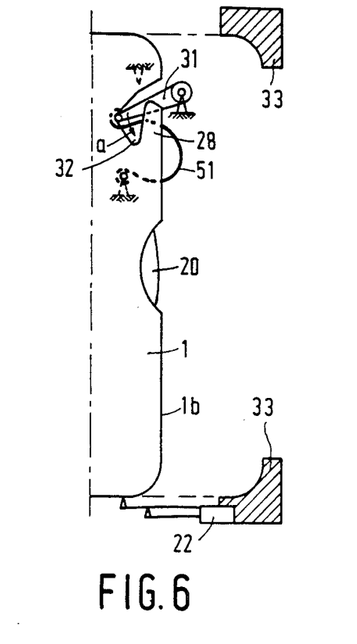
FIG. 6 is a schematic plan view of a part of the holder after it has been inserted manually into the disc-record player and the loading mechanism has been started.
Figure 7:
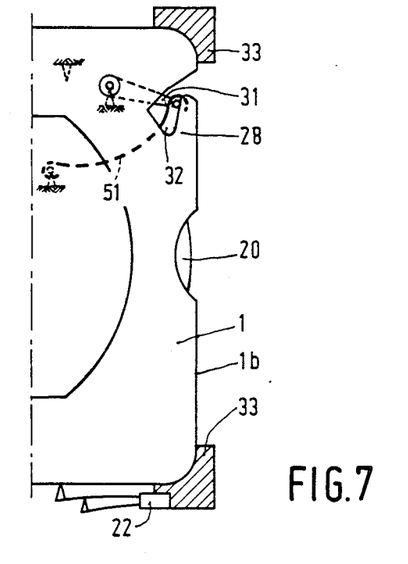
FIG. 7 is a schematic plan view of a part of the holder after it has been inserted fully by the loading mechanism.

Near its second peripheral side 1b the frame 1 is formed with a hook 28 which in conjunction with a retraction element 31 of a loading mechanism, as shown in FIGS. 5, 6 and 7, serves in the insertion of the holder into a disc-record player. FIG. 5 shows the holder partially inserted into the loading mechanism by hand. At the end of this partial insertion the retraction element 31 engages in a slot 32 in the frame 1, which slot is bounded partly by the hook 28 and opens out of the peripheral side 1b. When the holder has been inserted by hand through a given distance an electrical switch 22 of the loading mechanism is closed (FIG. 6) to start the drive of the loading mechanism, as shown schematically in FIG. 4.

The loading mechanism, which together with the holder constitutes a loading system for transferring the disc to the turntable, comprises an electric motor 41 which is started by means of the switch 22. Via a belt 42 the electric motor drives a gear wheel 43. This gear wheel reduces the speed for driving the loading mechanism and meshes with a gear wheel 44. This gear wheel provides a further speed reduction and drives a toothed wheel 45. The wheel 45 and a further toothed wheel 47 are fixed on a spindle 46 so that the wheel 47 rotates with the wheel 45. The wheel 45 has teeth 45b which, in a manner to be described hereinafter, mesh with the teeth of a gear wheel 48 for a part of the time that the loading mechanism is operative, which gear wheel 48 in turn drives a gear wheel 49 for a specific time. The retraction element 31 is rigidly connected to the spindle of a toothed wheel 50 and is positioned in one or the other of two end positions by means of a bistable spring 51. The toothed wheel 50 carries a blocking cam 50a and has teeth 50b extending over an arc of substantially 180° for meshing with the teeth of the wheel 49. In the position shown in FIG. 4, when the loading mechanism is in a rest position, the blocking cam 50a acts against projecting flanks of two teeth 49a on the gear wheel 49 in a manner similar to the cam of a Geneva mechanism to lock the loading mechanism.

Figure 8:
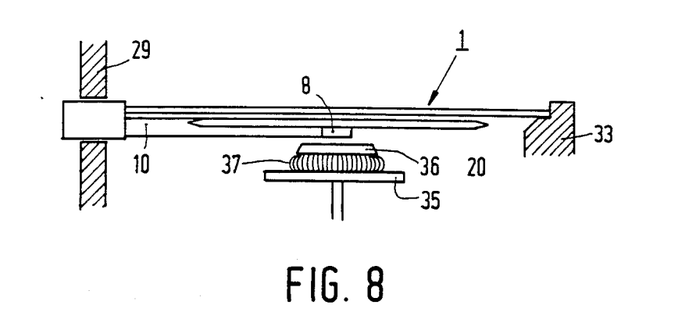
FIG. 8 is a schematic side view, partly in section, of the holder in the inserted position shown in FIG. 7, in which position the disc is situated above the turntable.
Figure 9:
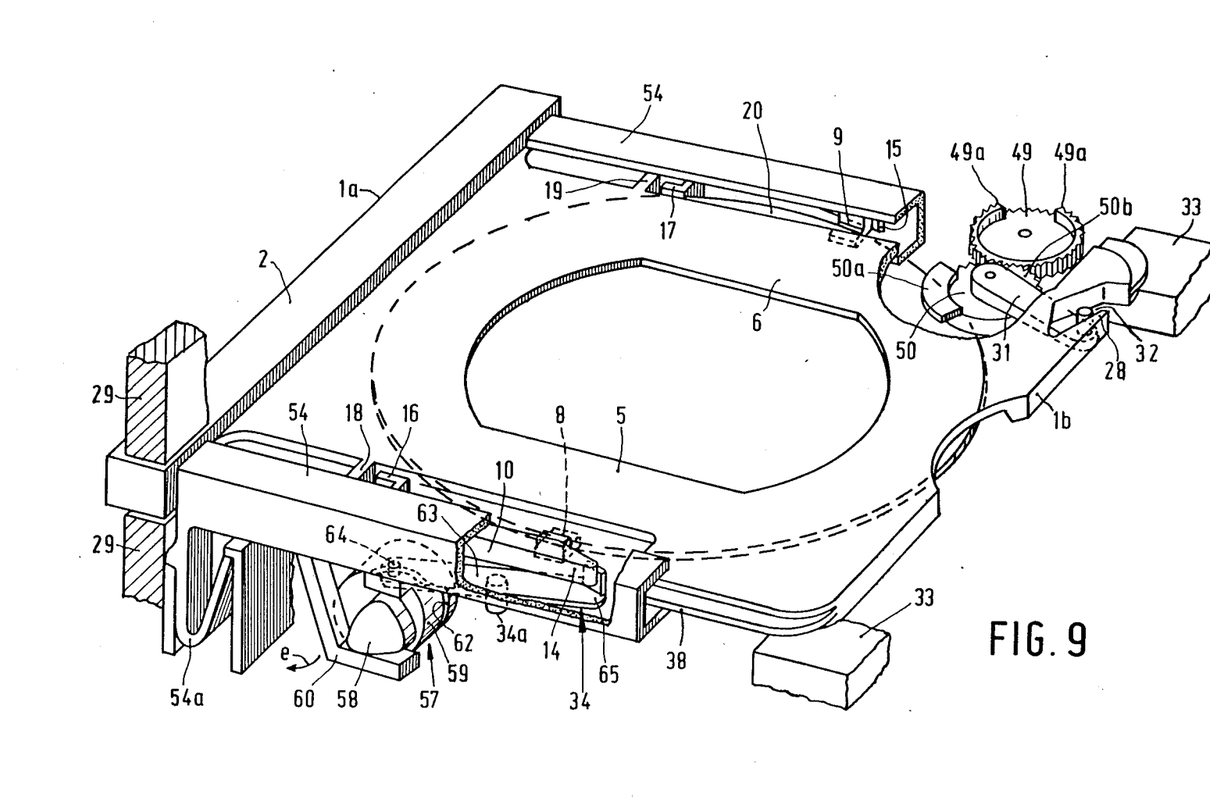
FIG. 9 is a perspective view of the holder and the loading mechanism in the position shown in FIG. 8.

The manual insertion of the holder into the loading mechanism rotates the retraction element 31 and with it the toothed wheel 50 in the direction indicated by the arrow a through an angle 52 (see FIGS. 4 and 6). The blocking cam 50a is thereby disengaged from the teeth 49a and the teeth 50b of the wheel 50 mesh with the teeth of the gear wheel 49. It is to be noted that the two latching teeth 49a on the gear wheel 49 do not allow the loading mechanism to be driven by the motor 41 until the toothed wheel 50 has been rotated through the angle 52. This ensures that the element 31 is positioned correctly behind the hook 28 and that in this position the holder cannot be withdrawn by hand. This precludes the risk of an incorrect position of the holder in the loading mechanism. When the retraction element 31 has reached the position shown in FIG. 6, and the gear wheel 49 is in mesh with the teeth 50b of the wheel 50, the element 31 has closed the switch 22 and has thus started the motor 41. After starting of the motor 41 the toothed wheel 45 is rotated through an angle 53 in the direction indicated by the arrow c via the gear transmission 43 and 44, thereby rotating the gear wheel 48 in the direction indicated by the arrow b. via the gear wheel 49 the gear wheel 48 drives the toothed wheel 50, which causes the element 31 to be pivoted further in the direction indicated by the arrow a, so that the holder is moved towards the end position shown in FIG. 7. The teeth 45b of the wheel 45 extend over an arc of substantially 90° and no further teeth on the wheel 45 cooperate with the gear wheel 48. The gear wheel 48 is then blocked by a blocking cam 45a on the wheel 45 acting against projecting flanks of two teeth 48a on the gear wheel 48, so that the gear wheel 49 and the toothed wheel 50 are also blocked, as a result of which the position of the element 31 is no longer influenced by the further rotation of the toothed wheel 45. At this instant the holder is latched in the end position shown in FIGS. 7, 8 and 9 and near its peripheral side 1b the frame 1 is supported by supports 33 in the disc-record player.

During the insertion movement the lateral edges of the frame at the third and fourth peripheral sides 1c and 1d thereof, respectively, engage in two channel-shaped lateral guides 54 (see FIG. 9) which are situated near a front wall 29 of the disc-record player, which guides are pivotally connected to the chassis of the record player by means of a resilient snap-in plate 54a and in the inserted position of the holder extend to the free ends of the resilient arms 10 and 11, respectively. In a manner to be described hereinafter the lateral guides 54 constitute control elements for the deflection of the frame 1. Further, when the holder is inserted the two actuating portions 14 and 15 of the arms 10 and 11, respectively, are coupled to release elements constituted by two two-armed release levers 34 which are pivotable about axes 34a (see FIGS. 9, 11, 12 and 13). It is to be noted that the frame 1 preferably has asymmetrical side edges 38, 39, at its third and fourth peripheral sides 1c and 1d, respectively, in order to ensure that the holder occupies the correct position relative to the turntable 35 of the disc record player during insertion into the lateral guides 54, i.e. with the disc-supporting surface facing the turntable 35.

Figure 10:
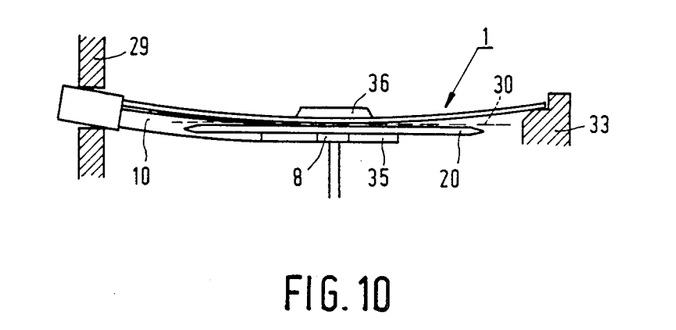
FIG. 10 is a view similar to FIG. 8 showing the holder in the deflected position when the disc has been lowered onto the turntable.

After the holder has been inserted and the frame 1 rests on the guides 54 and the supports 33 near the first and the second peripheral sides 1a, 1b, respectively, deflection of the holder begins. This is effected under the influence of the rotation of the toothed wheel 47, which is rigidly connected to the toothed wheel 45, in a direction as indicated by the arrow c in FIG. 4. This toothed wheel 47 rotates as long as the motor 41 is energized and has teeth 47b extending over an arc of approximately 240° outside the circumferential portion occupied by a blocking cam 47a. After rotation of the gear wheel 45 and hence the gear wheel 47 through the angle 53 the cam 47a moves away from two teeth 55a with projecting flanks on a gear wheel 55, so that the teeth 47b now begin to cause the gear wheel 55 to rotate in a direction as indicated by the arrow d. By means of a spindle 56 the gear wheel 55 is connected to two control units 57 (see also FIGS. 12 and 13). These control units are arranged so as to be mirror-symmetrical relative to the plane of symmetry 13 of the inserted holder and to be positioned at equal distances from the peripheral sides 1c and 1d of the frame 1 of the inserted holder. As is shown in FIGS. 9, 11, 12 and 13, the control units 57 each comprise a control cam 58, which is eccentric relative to the spindle 56, and a cylindrical control member 59 which is rigidly connected to the control cam and which is coaxial with the spindle 56. The control cam 58 is situated between the adjacent lateral guide 54 and a hook 60 on the lateral guide 54. During the first part of the rotation of the gear wheel 55 the lateral guides 54 are pivoted downwardly by the control cams 58 in the direction indicated by the arrow e in FIG. 9. As a result of this, the parts of the edges 38, 39 near the free ends of the arms 10 and 11, respectively, are urged downwards (FIG. 11) in the direction indicated by the arrow f, the arrow f being oriented perpendicularly to a plane containing the upper side of the turntable 35. This results in the holder being deflected at the location of the connecting elements 5 and 6, during which deflection the peripheral sides 1b, 1a remain at least substantially parallel to each other because the frame 1 is situated on the supports 33 and the lateral guides 54. During this deflection the disc is slid onto a centering mandril 36 of the turntable 35 and is moved over an annular compression spring 37 at the circumference of the mandril 36, which spring 37, after the disc 20 has passed it, urges the disc onto the turntable 35 (FIG. 10). In the deflected position of the holder the clamping members 8 and 9 are situated below a plane 30 tangential to the bowed connecting elements 5 and 6 (see FIG. 10) and still hold the disc.

Figure 12:
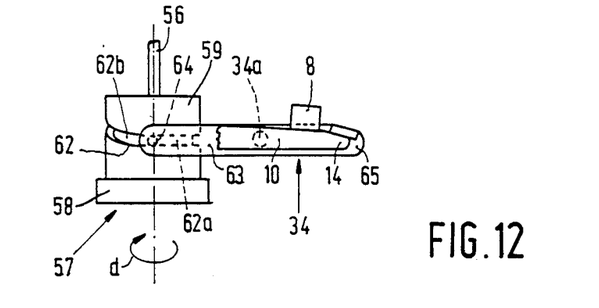
FIG. 12 is a schematic plan view of a release element and associated control element for controlling the clamping means in the rest position.

However, as soon as the disc has been pressed down correctly onto the turntable by the compression spring 37 the release elements 34 are actuated. This is achieved by means of the cylindrical control members 59, each of which has an endless control groove 62 in its circumferential wall (FIGS. 12, 13), which groove operates as a cam track and is engaged by a pin 64 on an end portion of the second arm 63 of the adjacent lever 34. The first arm 65 of the release levers 34 is cooperates with the actuating portions 14 and 15 on the arms 10 and 11. During the first part of the rotation of the gear wheel 55 in the direction indicated by the arrow d, each pin 64 is guided in a first part 62a of the associated control groove 62, which first part extends in a plane perpendicular to the spindle 56 of the control units 57 (FIG. 12). Thus, the release levers 34 are not pivoted during this part of the rotation of the gear wheel 55. This corresponds to the period in which the lateral guides 54 have caused the holder to flex.

Figure 11:
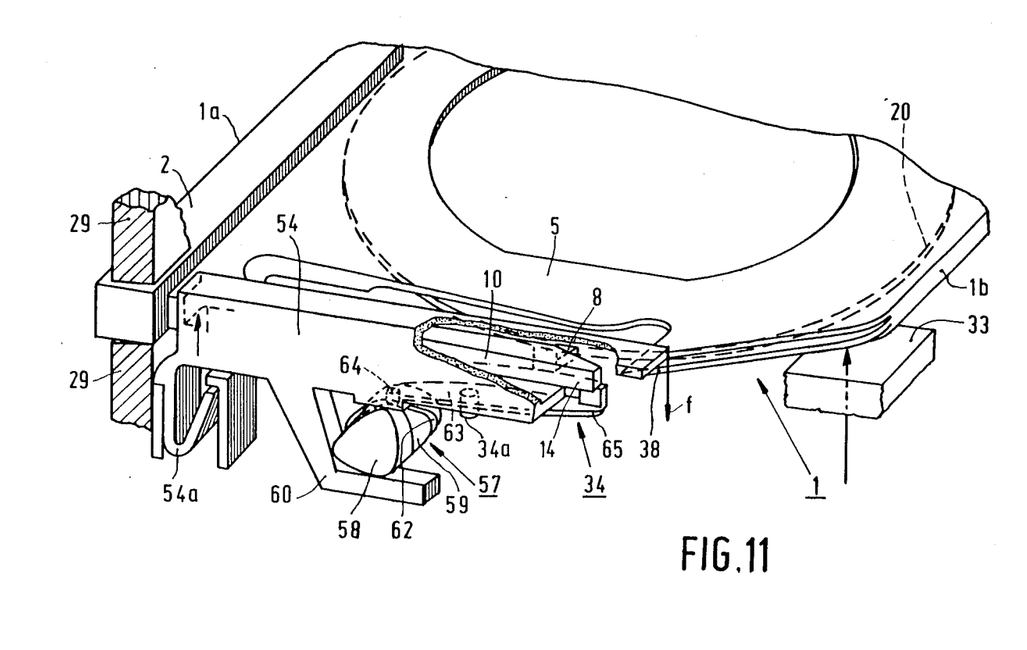
FIG. 11 is a perspective view of part of the holder and the loading mechanism in the position shown in FIG. 10.
Figure 13:
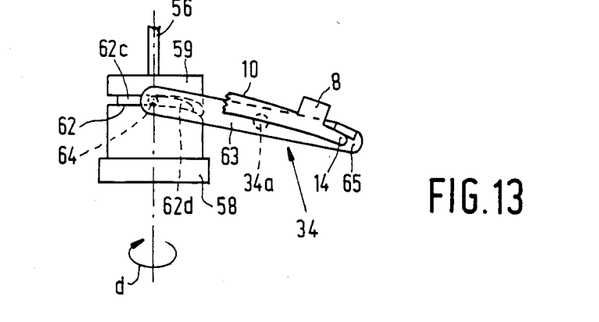
FIG. 13 is a schematic plan view of the parts shown in FIG. 12 in the actuated position of the clamping means.

After the cams 58 have reached the position shown in FIG. 11, each pin 64 is guided in a helically extending a second part 62b of the control groove 62 (FIG. 13), which second part 62b makes an acute angle with said plane which is perpendicular to the spindle 56. During this part of the rotation of the gear wheel 55 the two release levers are pivoted in opposite directions into respective positions of which one is shown in FIG. 13, so as to release the clamping members 8 and 9. The integration of each control cam 58 with the associated cylindrical control member 59 to form a control unit has the advantage that said functions, namely the deflection of the holder and the release of the clamping members, are synchronized correctly. It is to be noted that the movements of the clamping members 8 and 9 in opposite directions by means of the release levers 34 are limited by the projections 16 and 17 on the arms 10 and 11.

Figure 14:
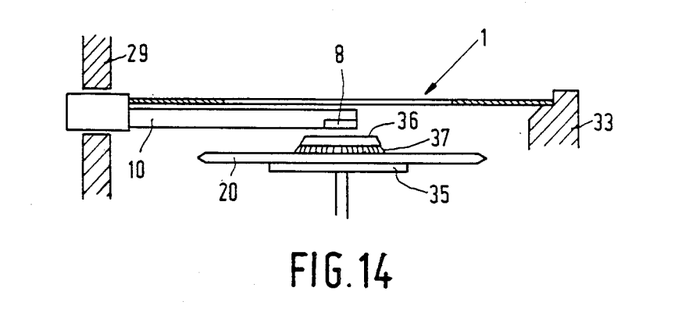
FIG. 14 shows the holder in the flat position shown in FIG. 8 but after the disc has been lowered onto the turntable.

During the subsequent third stage of the rotation of the gear wheel 55 the release levers 34 remain in the pivoted position shown in FIG. 13 as the pins 64 are guided in a third part 62c of the control groove, which part 62c extends in a plane perpendicular to the spindle 56, as a result of which the clamping members 8 and 9 remain in their released positions. During this third stage the cams 58 rotate further to the position shown in FIG. 9, so that the lateral guides 54 return to their initial positions. As a result of this, the frame 1 resumes its flat position (FIG. 14). Now each pin 64 is guided in a helically extending fourth part 62d to the first part 62a of the associated control groove 62, which part 62d makes an acute angle with a plane perpendicular to the spindle 56, so that the release levers pivot back and the clamping members 8 and 9 also return to the rest positions, under the influence of the resilience of the arms 10 and 11. At this instant a cam, not shown, on the toothed wheel 45 switches off the motor 41. Now it is possible to play back the disc.

If the disc is to be removed from the turntable the operations described above should be performed in the reverse direction and sequence. The motor 41 begins to rotate in the opposite direction, so that the various movements described above are repeated in opposite directions. For example, the clamping members 8 and 9 are again moved apart, the holder is deflected and the disc 20 is then gripped again by the clamping members 8 and 9 when they spring back. Subsequently, the flat position of the holder is restored, after which the element 31 moves the holder partially out of the disc-record player, so that the holder can be removed by hand.

The loading system described in the foregoing can be of a particularly simple construction comprising a small number of parts and is particularly suitable for used in record players of a compact construction. An example of this is a disc-record player mounted in the dashboard of a car.

The holder described in the foregoing has the advantage that it can be manufactured integrally from a plastics material (such as a polycarbonate), so that the holder had a resilience at the location of the connecting elements 5 and 5 such that it can resume the flat condition after deflection. In this respect it is important that the deflection is sustained only briefly when the loading system in accordance with the invention is in operation, so that the risk of permanent distortion of the holder in accordance with the invention is substantially nil.

As the holder in accordance with the invention can be manufactured comparatively cheaply, it may be used as a universal holder both for the storage of discs in a storage system and for loading these discs into a disc-record player. Manual insertion of the disc into the holder is easy because the disc simply snaps behind the clamping members 8 and 9. If necessary, the holder may be deflected slightly.

The holder described above is eminently suitable for use with optically readable discs of the "Compact-Disc" type, which have a comparatively small diameter and which can be stored effectively and also inserted readily into the disc-record player by means of the holder without the user having to touch the disc.

Apart from the embodiment shown, other constructions of the holder are possible. For example, instead of the two separate connecting elements 5 and 6 it is possible to employ one continuous connecting element. Further, it is possible to arrange the clamping members 8 and 9 at another location near the connecting elements.

What is claimed is:

1. A holder for a rigid information disc, including a rectangular frame which includes a first disc-supporting section situated near a first peripheral side of the frame and a second disc-supporting section adjoining a second peripheral side located opposite the first peripheral side, which frame carries movable clamping means for retaining the information disc on the frame and is at least in part resiliently deflectable and returns from a deflected position to a flat position, characterized in that the first and the second disc-supporting sections are interconnected by at least one deflectable and resilient connecting element which cooperates with the frame in its deflected position, in which position the first and second peripheral sides extend at least substantially parallel to one another, and further characterized in that the clamping means comprise actuating portions and said clamping means are situated near said connecting element, and in the deflected position of the frame said clamping means release the information disc only after said actuating portions have been actuated.

2. A holder as claimed in claim 1, characterized in that two connecting elements are arranged between the disc-supporting sections, which connecting elements are each substantially strip-shaped and extend at least substantially perpendicularly to the first and the second peripheral sides of the frame.

3. A holder as claimed in claim 2, characterized in that the two connecting elements are situated one near each of the third and fourth peripheral sides of the frame and the frame is open between the connecting elements.

4. A holder as claimed in claim 3, in which the clamping means comprise clamping members which are resiliently movable relative to the frame, characterized in that there are provided two clamping members which are each carried on a resiliently deflectable arm which is connected at one end to the frame, the two arms being situated one adjacent each of the third and fourth peripheral sides of the frame.

5. A holder as claimed in claim 4, characterized in that the clamping members are situated at a distance from a disc-supporting surface formed by the connecting elements and the disc-supporting sections and near those edges of the connecting elements which face the third and fourth peripheral sides, respectively, of the frame, and the clamping members keep the information disc clamped against the disc-supporting surface in the flat position of the frame.

6. A holder as claimed in claim 4 or 5, characterized in that in the deflected position of the frame the clamping members are situated beneath a plane tangential to the connecting elements and hold the information disc against central portions of the connecting elements.

7. A holder as claimed in claim 4, characterized in that near its free end each arm carries both the respective clamping member and the respective actuating portion, and the actuating portions on the two arms are movable in opposite directions to release the information disc, each arm carrying a stop for limiting the movement of the respective actuating portion.

8. A holder as claimed in claim 7, characterized in that the free end of each arm is situated near a plane which extends perpendicularly to the frame at substantially equal distances from the disc-supporting sections.

9. A loading system comprising a loading mechanism carried by a chassis and a holder as claimed in claim 3 to transfer the disc to a turntable, characterized in that the loading mechanism comprises control elements which are movable relative to the chassis and which are arranged to bear against the frame of the holder at the third and fourth peripheral sides thereof, and supporting elements which are stationary relative to the chassis and which are arranged to support the frame near its first and second peripheral sides, the control elements, at least near the connecting elements, being movable in a downward direction towards a plane containing the upper side of the turntable to bring the frame into the deflected position.

10. A loading system as claimed in claim 9, characterized in that the control elements comprise two channel-shaped lateral guides which are arranged to receive parts of lateral edges of the frame at the third and fourth peripheral sides thereof and which extend to the free ends of the resilient arms of the holder when the latter is inserted in the loading mechanism and which are pivotally connected to the chassis at points which, when the holder is inserted in the loading mechanism, are situated near the first peripheral side of the frame.

11. A loading system as claimed in claim 9, characterized in that the downward movement of the control elements is controlled by two eccentrically journalled control cams which form parts of two control units which also control release elements for the clamping means of the holder.

12. A loading system as claimed in claim 11, characterized in that each control unit comprises a cylindrical control member which is rigidly connected to the control cam and is rotatable therewith about the same axis and which has a control groove in its circumferential wall, and each release element is constituted by a two-armed pivotal release lever having a first arm which is cooperable with an associated one of the actuating portions of the clamping means of the holder and a second arm which is cooperable with the control groove in an associated one of the control members to control the respective release lever.

13. A loading system as claimed in claim 12, characterized in that the control groove in each cylindrical control member has a first part which extends in a plane perpendicular to the axis of rotation of the control unit and a helically extending second part which makes an acute angle with said plane, each release lever being pivotable by cooperation with the second part of the respective control groove, and the second part of each control groove being so situated relative to the profile of the associated cam that the associated release lever is not pivoted until the cam has moved the associated control element in a downward direction.

14. A loading system as claimed in claim 13, characterized in that the two control units are so arranged that when the holder is inserted in the loading mechanism the control units are mirror-symmetrical relative to a plane of symmetry of the holder which is situated at equal distances from the third and fourth peripheral sides of the frame of the holder.

15. A loading system as claimed in claim 11, characterized in that the two control units are arranged to be driven by a central drive means of the loading mechanism, which drive means is also adapted to drive a retraction element which brings the holder with the disc to a position above the turntable, the control units being disengaged from the drive means when the retraction element is being driven.

16. A holder for a rigid information disc comprising a frame having opposite first and second peripheral sides, first and second disc-supporting sections respectively adjacent said sides, and movable clamping means carried by said frame for releasably retaining said disc on said frame, said frame being initially flat and being at least in part resiliently deflectable for returning from a deflected bowed shape to said flat shape, said frame comprising at least one resilient connecting element joining said first and second disc-supporting sections, said frame being deflectable to said bowed shape by deflection of said connecting element wherein said first and second peripheral sides extend at least substantially parallel to each other, and said clamping means are located near said connecting element and comprise an actuating portion which when actuated releases said disc from said frame.

17. Apparatus according to claim 16 wherein said disc-supporting sections are spaced apart, and said frame is generally rectangular and comprises a pair of said connecting elements which are spaced apart and have their opposite ends respectively joined to said two disc-supporting sections.

18. Apparatus according to claim 17 wherein said connecting elements are substantially strip-shaped and extend substantially perpendicularly to said first and second peripheral sides.

19. Apparatus according to claim 17 wherein said clamping means comprises a pair of clamping members each comprising a resiliently deflectable arm having one end attached to said frame and a free end.

20. Apparatus according to claim 17 wherein said clamping members resiliently urge said disc against said disc-supporting surfaces when said frame is in said flat shape.

21. Apparatus according to claim 20 wherein each of said clamping members comprises an actuation portion on said free end of said arm, said two actuation portions being movable away from each other for releasing said disc, said frame further comprising means for moving said actuation portions to release said disc.

22. Apparatus according to claim 16 in combination with a loading mechanism carried by a chassis of a disc player, for transferring a disc from said frame to the turntable of said player, said loading mechanism comprising a pair of control elements which are movable relative to said chassis and positioned to bear against said frame, and means for said loading mechanism whereby said control elements drive said frame to said deflected shape and move said disc to said turntable and actuate said clamping means to release said disc onto said turntable.

23. Apparatus according to claim 22 wherein each of said control elements comprises an eccentrically journalled control cam the rotation of which drives said frame to said deflected shape.

24. Apparatus according to claim 22 wherein said loading mechanism is operable reversably for cyclically transporting a disc to and from a turntable.

* * * * *